United States Patent
Geiger

(10) Patent No.: US 8,336,696 B2
(45) Date of Patent: Dec. 25, 2012

(54) FRICTION CLUTCH FOR TRANSMITTING TORQUE

(75) Inventor: Sigmund Geiger, Markdorf (DE)

(73) Assignee: LICOS Trucktec GmbH, Markdorf (DE)

( * ) Notice: Subject to any disclaimer, the term of this patent is extended or adjusted under 35 U.S.C. 154(b) by 592 days.

(21) Appl. No.: 12/487,772

(22) Filed: Jun. 19, 2009

(65) Prior Publication Data
US 2009/0321213 A1    Dec. 31, 2009

(30) Foreign Application Priority Data

Jun. 27, 2008    (DE) .......................... 10 2008 030 165

(51) Int. Cl.
*F16D 27/01*    (2006.01)
*F16D 27/112*   (2006.01)
(52) U.S. Cl. ............................... 192/84.31; 192/84.961
(58) Field of Classification Search ............... 192/84.31
See application file for complete search history.

(56) References Cited

U.S. PATENT DOCUMENTS

| | | | | | |
|---|---|---|---|---|---|
| 2,738,449 | A | * | 3/1956 | Mason | 335/234 |
| 2,956,658 | A | * | 10/1960 | Jaeschke | 192/84.31 |
| 3,263,784 | A | * | 8/1966 | Pierce | 192/84.31 |
| 3,899,061 | A | * | 8/1975 | Krug | 192/84.31 |
| 2004/0118656 | A1 | * | 6/2004 | Inoue et al. | 192/84.31 |

* cited by examiner

*Primary Examiner* — Rodney Bonck
(74) *Attorney, Agent, or Firm* — Burr & Brown

(57) ABSTRACT

A friction clutch for transmitting torque from a rotor, which can be driven about an axis S, to an element which is to be driven, including a friction disk clutch having an electromagnet arrangement which includes a coil and a magnetically conductive portion including a web section lying radially on the outside with respect to the axis S and a web section lying radially on the inside and oriented axially, and permanent magnets via which an axially movable friction section of the friction disk clutch is magnetically connected to the rotor. When the electromagnetic arrangement is in an electrically switched on state, a bearing of the friction section against the rotor is eliminated by attenuating the magnetic attraction effect of the permanent magnets.

10 Claims, 1 Drawing Sheet

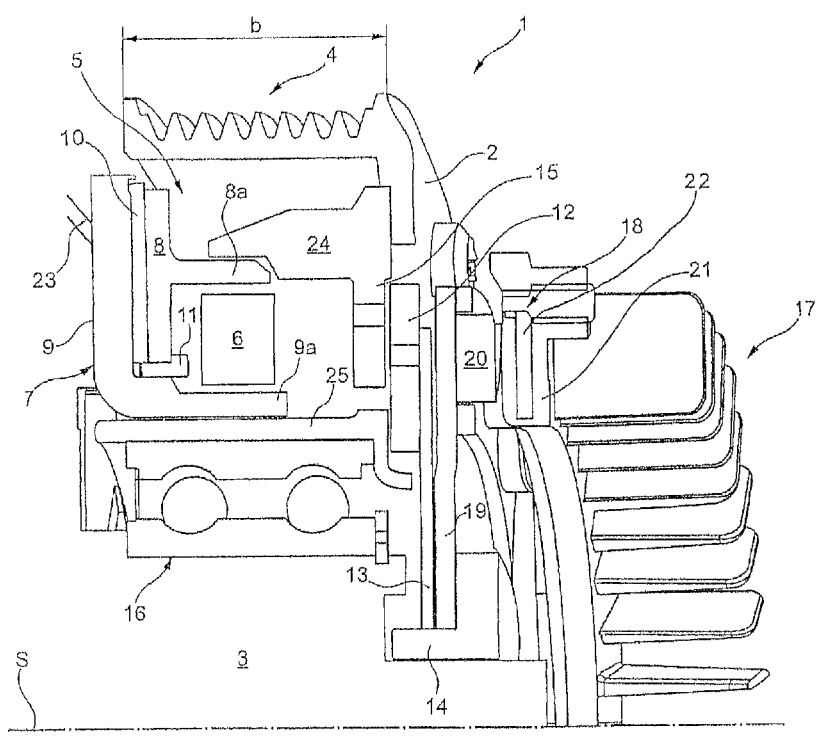

# FRICTION CLUTCH FOR TRANSMITTING TORQUE

This application claims the benefit under 35 USC §119(a)-(d) of German Application No. 10 2008 030 165.5 filed Jun. 27, 2008, the entirety of which is incorporated herein by reference.

FIELD OF THE INVENTION

The invention relates to a friction clutch for transmitting torque from a rotor to an element which is to be driven.

BACKGROUND OF THE INVENTION

Attempts have already been made to improve electromagnetically activated clutches in devices for cooling internal combustion engines, in particular in vehicles, with respect to an emergency operating mode in the case of a functional failure of an electromagnetic part.

In such clutches, for example, electromagnetic arrangements are used which have permanent magnets with which a friction clutch can be activated. By connecting the electromagnetic part into the circuit it is possible to deactivate the effect of the permanent magnets.

Until now, corresponding arrangements have not been suitable for practical purposes, in particular sufficiently high torques cannot be made available.

SUMMARY OF THE INVENTION

The object of the present invention is to configure arrangements of the type denoted in the introduction so that they are suitable for practical purposes, in particular for use in the field of vehicles.

The invention is based on a friction clutch for transmitting torque from a rotor, which can be driven about an axis S, to an element which is to be driven, comprising a friction disk clutch having an electromagnet arrangement which has a coil former and ferromagnetically conductive magnetically conductive means which at least partially surround the coil former and which comprise a web section lying radially on the outside with respect to the axis and a web section lying radially on the inside with respect to the axis and oriented axially, and permanently magnetic means provided adjacent to the magnetic conductive means, via which permanently magnetic means an axially movable friction section of the friction disk clutch can be magnetically connected to the rotor, wherein, in the electrically switched on state of the electromagnet arrangement, the bearing of the friction section against the rotor can be eliminated by attenuating the magnetic attraction effect of the permanently magnetic means. The core of the invention is that the permanently magnetic means are embodied in such a way that a portion of the permanently magnetic means extends further outward in the radial direction with respect to the axis than the web section lying radially on the outside and/or extends further inward than the web section lying radially on the inside. As a result, the permanently magnetic means, for example permanent magnets, can be improved with respect to their arrangement or configuration, for example maximum possible dimensions. As a result, it is possible, in particular, to increase an attraction effect which is possible with the permanently magnetic means or increase a maximum value of a transmission of torque from the rotor to the element which is to be driven. This can be achieved, in particular, without additionally necessary installation space or costly measures. As a result of the proposed geometric adaptation, the permanently magnetic means can be used to make available larger magnetically effective surface areas. This is because it has been found that the permanently magnetic means permit an increased magnetically effected attraction force acting on the friction section to be achieved through the projection of the coil former and/or of the surrounding web sections in the radial direction. In this context the friction section itself cannot project significantly in the radial direction beyond the coil former or the web sections. It is particularly advantageous that an existing friction clutch coupling does not require any greater installation space as a result of the inventive measure and, apart from the magnetically conductive means and the permanently magnetic means there is no need to adapt any further elements.

Furthermore, it is proposed that the magnetically conductive means have a part which is T-shaped in cross section and has a central part, and a transverse part which is oriented at an angle with respect to the central part, wherein the web section lying radially on the outside is formed with the central part. With this simple adaptation of part of the magnetically conductive means it is possible to embody the friction clutch in a particularly compact way, wherein at the same time the permanently magnetic means can advantageously be accommodated. The transverse part provides the permanently magnetic means with an annular face which is oriented radially and transversely with respect to the axis in the installed state and which correspondingly makes available an enlarged pick-up area for their magnetic flux lines. The extent of the annular face on the transverse part, and therefore the bearing face for the permanently magnetic means, are, in particular, not bounded by an axial web section in at least a radial direction, that is to say for example radially outward.

As a result of the comparatively large area of the permanently magnetic means compared to previous attempts at a solution, the magnetic forces which can be achieved therewith can also be increased since the magnetic effect is not only dependent on volume and material etc. but also on the area. With the proposed arrangement it is possible to make the permanently magnetic means comparatively thin owing to the area effect in order to achieve the same magnetic force, and with the same thickness of the permanently magnetic means it is possible to achieve a higher magnetic attraction effect or attraction force compared to previous arrangements. The magnetic flux density which is observed in the magnetically conductive means is correspondingly increased and as a result a higher torque can be transmitted to the permanently magnetic means.

Furthermore it is advantageous that the magnetically conductive means have a part which is L-shaped in cross section and has two limbs which are at an angle with respect to one another, with the web section lying radially on the inside being formed with one of the limbs. As a result, the radially inner web section can be implemented around the coil former in a simple and space-saving fashion. The L-shaped part and, if appropriate, also the T-shaped part can be formed, for example, from a sheet metal material as a bent part or welded or soldered part.

It is also advantageous that a section of the T-shaped part and a section of the L-shaped part lie opposite one another in such a way that a radially oriented gap, in which the permanently magnetic means are arranged, is provided along the transverse part. As a result of the combination of the parts with a cross-sectional T shape or L shape it is possible to make the magnetically conductive means compact through corresponding positioning of the two parts. It is also possible to readily set or predefine a desired gap length in the radial direction and a gap width in the axial direction, which permits different dimensions of the permanently magnetic means to be used. This is because the permanently magnetic means are then introduced into the gap region in particular in such a way that they fill it, which is also explained further below. The permanently magnetic means are embodied, for example, as permanent magnets in an annular disk region.

The permanently magnetic means generally bear directly or indirectly both against sections of the T-shaped part and against sections of the L-shaped part and are, for example, bonded or soldered on. The permanently magnetic means can in this way serve to form a secure connection of the T-shaped part and of the L-shaped part, as a result of which it is possible to dispense with additional connecting means, for example screwing means. Furthermore, the permanently magnetic means are therefore particularly well secured in the permanent magnet arrangement in a planar fashion without an air gap, which is positive in respect of the formation of the magnetic flux lines.

It is particularly advantageous that the T-shaped part and the L-shaped part are magnetically decoupled except for the permanently magnetic means located between them. A magnetic short circuit in the region of the permanently magnetic means without magnetic flux through the web sections to the friction section is therefore reliably avoided. The magnetic line profile can instead permit a desired optimum attraction force on the axially movable friction section through the permanently magnetic means. If appropriate, magnetically insulating intermediate elements are to be provided between the T-shaped part and the L-shaped part in order to influence the formation of the magnetic flux lines.

In a further preferred embodiment of the subject matter of the invention, the permanently magnetic means are positioned at the T-shaped part on a side on the transverse part lying opposite the central part. As a result, the permanently magnetic means can be mounted on a planar or continuously formed side of the T-shaped part.

The permanently magnetic means are preferably embodied in an annular disk region. As a result, the friction clutch can be embodied in a compact fashion and in such a way that it is concentric with respect to the axis or surrounds said axis. A permanently magnetic means part which is accommodated in an annular disk region and which can comprise, for example, a permanent magnet in the form of an annular disk can be adapted easily to a desired configuration with respect to the thickness of the annular disk or the planar dimension.

The permanently magnetic means advantageously extend when viewed in the radial direction with respect to the axis, over at least significant regions of the radial dimension of the coil former. As a result, on the one hand, a large attraction force acting on the axially movable friction section can be effectively achieved and, furthermore, the elimination of the attraction effect of the permanently magnetic means on the friction section can be compensated or eliminated by energizing the coil former. The invention permits positioning of the permanently magnetic means and of the magnetically conductive means in relation to the coil former in a mutually matched fashion so that optimum formation of the magnetic flux lines of the permanently magnetic means when the electromagnet of the electromagnet arrangement is not energized is effected and an ideal cancelation or compensation of the magnetic flux lines of the permanently magnetic means is effected when the electromagnet is energized, in such a way that the friction section is reliably separated from the rotor.

The permanently magnetic means can in particular extend radially outward over the web section lying radially on the outside since there is generally more space there for the accommodation of the permanently magnetic means than radially inward with respect to the coil former, where, in particular, the bearing for the rotor or other elements requires installation space.

Finally, it is also proposed that the rotor is embodied as a belt pulley with a belt support, wherein the coil former, the web sections and the permanently magnetic means are arranged inside the axial extent of the belt support. In order to limit the spatial requirement in the axial direction it is therefore advantageous, for example, to accommodate the friction clutch with the corresponding parts in the radial direction between the belt support and, for example, bearing means.

BRIEF DESCRIPTION OF THE DRAWINGS

Further advantages and features of the invention will be explained with reference to the single figure which is a sectional illustration through part of a friction clutch according to the invention.

The FIGURE shows a cross section through a perspectively illustrated part of an arrangement for transmitting a rotational movement with a rotor which is driven by an internal combustion engine.

DETAILED DESCRIPTION OF THE INVENTION

For this purpose, a friction clutch 1 with a rotationally driven rotor 2 for driving a shaft 3 is provided. The rotor 2 is configured here, for example, as a belt pulley with a belt support 4 for a multiple V belt (not shown). The belt support 4 has an axial extent b with respect to the axis S. An electromagnet arrangement 5 of a failsafe design or with failsafe protection is accommodated radially further inward with respect to the belt support 4. The schematically shown electromagnet arrangement 5 comprises a coil 6, which is surrounded at least partially by magnetically conductive means 7. The magnetically conductive means 7 comprise, according to the figure, a part 8 which is T-shaped in cross section and a part 9 which is L-shaped in cross section. Permanent magnets 10 are accommodated in a radially outwardly directed gap region between the parts 8 and 9. The connection and the cohesion of the T-shaped part 8 and of the L-shaped part 9 can be implemented by means of the permanent magnets 10. An intermediate annular element 11 for magnetically isolating or decoupling the two ferromagnetic parts 8 and 9 is provided between the part 8 and the part 9, on the radially inner side adjacent to the permanent magnets 10.

An armature element 12 is attached, as an axially movable friction section of the friction clutch 1, via an armature spring 13 to a sleeve 14 which is connected to the shaft 3 so as to rotate with it. The armature element 12 is also made of a ferromagnetic material and is attracted by the magnetic effect of the permanent magnets 10 in a frictionally locking fashion to a friction section 15 of the rotor 2 for a non-positive connection between the armature element 12 in the friction section 15. In this state, the entire rotational speed of the rotor 2 is transmitted to the shaft 3 via the friction section 15, the armature element 12, the armature spring 13 and the sleeve 14.

The electromagnet arrangement 5 is securely attached to a housing section, for example. The latter may be, for example, the water pump casing of a cooling water pump if the friction clutch 1 serves to drive a water pump via the shaft 3. The web sections 8a and 9a are spaced apart from adjacent webs 24 and 25 of the rotor 2 by means of a gap. The rotor 2 is rotatably mounted on the shaft 3 by means of the radially inner web 25 via a ball bearing 16. A ribbed wheel 17, which, via an eddy current clutch 18, causes the shaft 3 to rotate with a lower rotational speed than the drive rotational speed of the rotor 2 if the armature element 12 is not connected to the rotor 2 so as to rotate with it, is connected to the rotor so as to rotate with it.

Permanent magnets 20 are mounted concentrically with respect to the axis S with alternating polarity on a flange 19, which is also securely mounted on the sleeve 14, and are spaced apart from an annular section 21 of the ribbed wheel 17 by means of a gap. In the annular section 21, which is formed, for example, from aluminum, a steel ring 22 is cast in, as a result of which, when the armature element 12 is separated from the friction section 15, the ribbed wheel 17, which rotates at the rotational speed of the rotor, transmits a drive rotational speed to the shaft 3 via the eddy current clutch 18.

An increased attraction force of the armature element 12 through the permanent magnets 10 is essential for the increased transmission of torque between the rotor 2 and shaft 3 in the state of full drive when the armature element 12 is attracted. For this purpose, the part 8 is embodied in a T shape, with the result that on the part 8 the permanent magnets 10 extend in the radial direction virtually over the entire coil 6 and radially further outward as far as below the belt support 4. As a result, a comparatively large effective area of the permanent magnets 10 can be obtained, as a result of which a larger axial magnetic attraction force acts on the armature element 12.

The permanent magnets 10 are arranged in a direct arrangement in the direction of flux of the magnetic lines in the web sections 8a and 9a, as a result of which the magnetic flux emanating from the permanent magnets 10 is amplified.

In order to cancel out or compensate the magnetic effect of the permanent magnets 10 in an electromagnetically effected fashion, the permanent magnets 10 are advantageously positioned in a way which is adapted to the parts 8 and 9 and the coil 6 such that, when the coil 6 is energized, for example via a cable 23, the attraction effect on the armature element 12, which is brought about by the permanent magnets 10, is compensated or reliably cancelled out through a counteracting coil magnetic field.

The permanent magnets 10 are advantageously made to extend radially outside the coil 6, as a result of which a higher permanently magnetic attraction effect is achieved by virtue of the larger annular surface of the permanent magnets 10.

In order to conduct the magnetic flux lines of the permanent magnets 10 from the web sections 8a and 9a as far as the armature element 12 in the attracted state when the coil 6 is not energized, the friction section 15 is provided with webs 24 and 25 which are directed axially with respect to the web sections 8a and 9a. The webs 24 and 25 are radially separated by a small air gap and overlap axially with the web sections 8a and 9a.

List of Reference Numerals
1 Friction clutch
2 Rotor
3 Shaft
4 Belt support
5 Electromagnet arrangement
6 Coil
7 Magnetically conductive means
8 T part
8a Web section
9 L part
9a Web section
10 Permanent magnet
11 Intermediate annular element
12 Armature element
13 Armature spring
14 Sleeve
15 Friction section
16 Ball bearing
17 Ribbed wheel
18 Eddy current clutch
19 Flange
20 Permanent magnet
21 Annular section
22 Steel ring
23 Cable
24 Web
25 Web

The invention claimed is:

1. A friction clutch for transmitting torque from a rotor, which is driven about an axis S, to an element which is to be driven, comprising: a friction disk clutch having an electromagnet arrangement including a coil and magnetically conductive means which at least partially surrounds the coil and which includes a web section lying radially on the outside with respect to the axis S and a web section lying radially on the inside with respect to the axis S and oriented axially, and permanent magnetic means provided adjacent to the magnetically conductive means and via which an axially movable friction section of the friction disk clutch is magnetically connected to the rotor by a magnet attraction effect, wherein, in the electrically switched on state of the electromagnet arrangement, a bearing of the friction section against the rotor is eliminated by attenuating the magnetic attraction effect of the permanent magnetic means, wherein a portion of the permanent magnetic means extends further outward in the radial direction with respect to the axis S than the web section lying radially on the outside and/or extends further inward than the web section lying radially on the inside, and wherein the magnetically conductive means further comprises a part which is T-shaped in cross section and has a central part, and a transverse part which is oriented at an angle with respect to the central part, wherein the web section lying radially on the outside with respect to the axis S is formed with the central part.

2. The friction clutch as claimed in claim 1, the magnetically conductive means further comprises a part which is L-shaped in cross section and has two limbs which are at an angle with respect to one another, with the web section lying radially on the inside with respect to the axis S being formed with one of the limbs.

3. The friction clutch as claimed in claim 1, the magnetically conductive means further comprises a part which is L-shaped in cross section having two limbs that are at an angle with respect to one another with the web section lying radially on the inside with respect to the axis S being formed with one of the limbs, wherein the transverse part of the T-shaped part and one of the limbs of the L-shaped part lie opposite one another with a radially oriented gap therebetween, and the permanent magnetic means is arranged in the radially oriented gap.

4. The friction clutch as claimed in claim 3, wherein the T-shaped part and the L-shaped part are magnetically decoupled except for the permanent magnetic means located between them.

5. The friction clutch as claimed in claim 3, wherein the permanent magnetic means is positioned at the T-shaped part on a side on the transverse part lying opposite the central part.

6. The friction clutch as claimed in claim 1, wherein the permanent magnetic means is embodied in an annular disk region.

7. The friction clutch as claimed in claim 1, wherein the permanent magnetic means extends, when viewed in the radial direction with respect to the axis, over substantially the entire radial dimension of the coil.

8. The friction clutch as claimed in claim 1, wherein the permanent magnetic means extends, when viewed in the radial direction with respect to the axis S, outward and/or inward beyond the coil.

9. The friction clutch as claimed in claim 1, wherein the rotor is embodied as a belt pulley with a belt support, wherein the coil, the web sections and the permanent magnetic means are arranged inside an axial extent of the belt support.

10. The friction clutch as claimed in claim 1, the magnetically conductive means further comprises a part which is L-shaped in cross section and has two limbs which are at an angle with respect to one another, with the web section lying radially on the inside with respect to the axis S being formed with one of the limbs.

* * * * *